Figure 1:
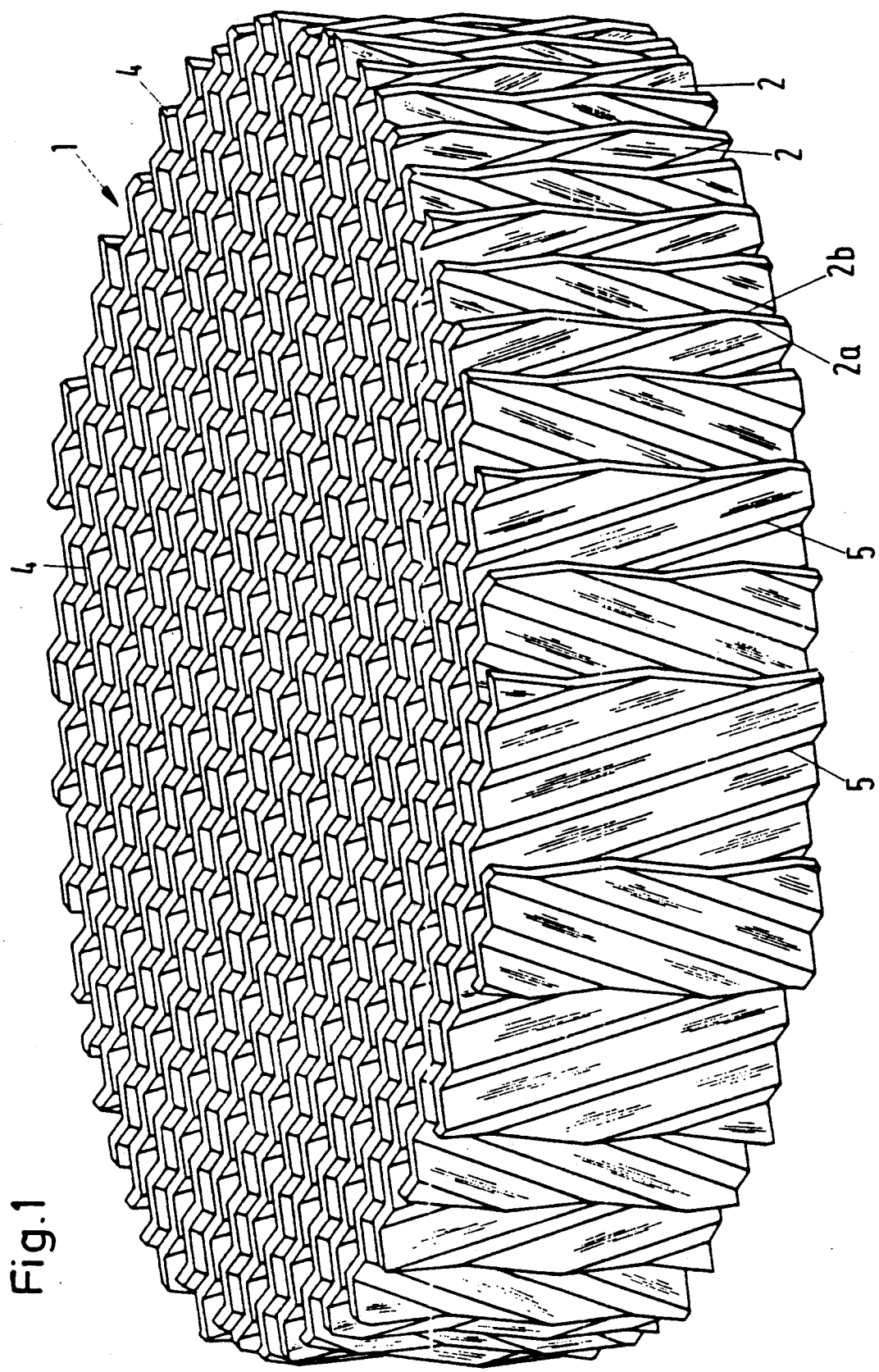

United States Patent [19]

Luder et al.

[11] Patent Number: 5,032,156
[45] Date of Patent: Jul. 16, 1991

[54] DEVICE FOR PERFORMING A SORPTION PROCESS

[75] Inventors: Jurgen Luder, Zurich; Ronald Shelden, Winterthur; Jean-Paul Stringaro, Bulach, all of Switzerland

[73] Assignee: Sulzer Brothers Limited, Winterthur, Switzerland

[21] Appl. No.: 420,285

[22] Filed: Oct. 12, 1989

[30] Foreign Application Priority Data

Nov. 1, 1988 [CH] Switzerland .................. 04061/88

[51] Int. Cl.$^5$ ............................................. B01D 15/08
[52] U.S. Cl. ...................................... 55/269; 55/386; 55/387; 55/523
[58] Field of Search .................. 55/197, 269, 386–390, 55/523; 210/198.2, 198.3

[56] References Cited

U.S. PATENT DOCUMENTS

| 2,845,136 | 7/1958 | Robinson | 55/386 |
| 3,407,573 | 10/1968 | Crowley | 55/386 |
| 3,498,024 | 3/1970 | Calvert, Sr. | 55/386 X |
| 3,657,864 | 4/1972 | Davis, Jr. et al. | 55/386 |
| 3,683,591 | 8/1972 | Glav | 55/390 X |
| 3,796,657 | 3/1974 | Pretorius et al. | 55/386 X |
| 3,856,681 | 12/1974 | Huber | 55/386 X |
| 3,954,608 | 5/1976 | Valentin | 55/386 X |
| 4,200,441 | 4/1980 | Hönmann et al. | 55/390 X |
| 4,652,280 | 3/1987 | Boeren et al. | 55/197 X |
| 4,675,104 | 6/1987 | Rai et al. | 210/198.2 |
| 4,769,053 | 9/1988 | Fischer, Jr. | 55/390 X |

FOREIGN PATENT DOCUMENTS

| 0289755 | 11/1988 | European Pat. Off. . | |
| 63-162014 | 7/1988 | Japan | 55/389 |
| 01-151706 | 6/1989 | Japan | 55/389 |
| 01-168311 | 7/1989 | Japan | 55/389 |
| 547120 | 3/1974 | Switzerland . | |
| 642564 | 4/1984 | Switzerland . | |

Primary Examiner—Robert Spitzer
Attorney, Agent, or Firm—Kenyon & Kenyon

[57] ABSTRACT

The device for the performance of sorption processes is in the form of a static mixer and comprises a number of folded double-walled layers which contact one another. The layers are double walled with at least some of the resulting gaps being filled with sorption material. The walls of the layers are permeable by the adsorptives and impermeable by the sorption materials. The device can be used with advantage for chromatography separation processes and permits use of a broad spectrum of sorption materials, increases the working life and improves process reliability.

16 Claims, 3 Drawing Sheets

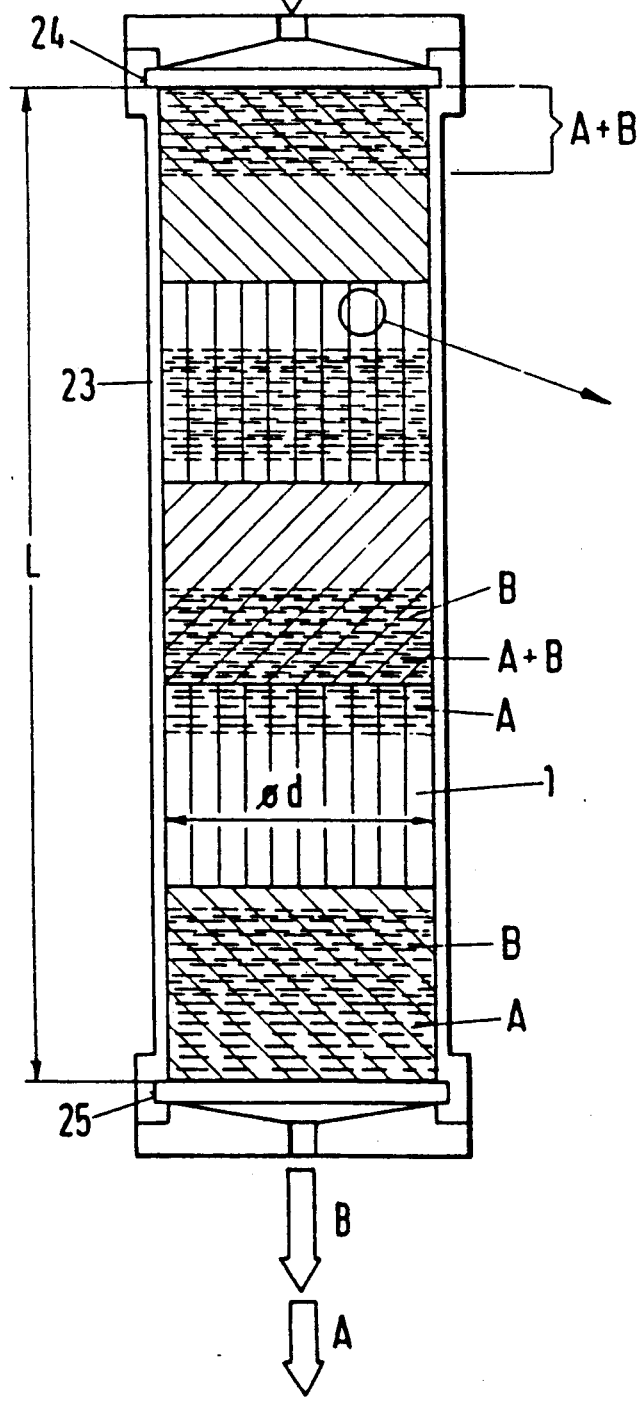
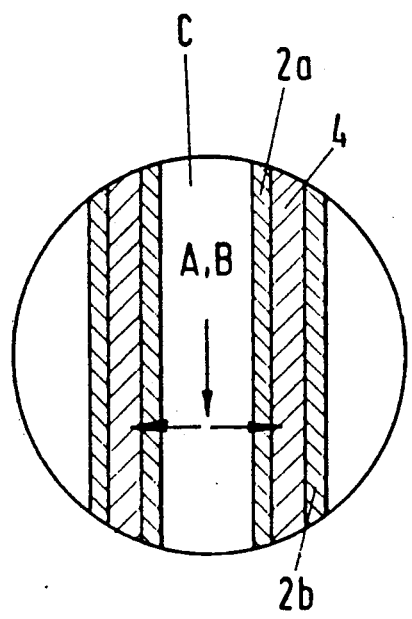
Fig. 3
Fig. 4

DEVICE FOR PERFORMING A SORPTION PROCESS

This invention relates to a device for performing a sorption process. More particularly, this invention relates to a device capable of use as a chemisorption device as well as a chromatography separating apparatus.

The term "sorption" is to be understood in the present context as denoting adsorption, absorption and chemisorption. Adsorption will be discussed more particularly hereinafter as representing the three sorption affects.

Heretofore, adsorbers have been known in which irregular fills of solid adsorbent, for example, in ball or pellet form, are provided and are flowed through by a mixture containing a component to be adsorbed or absorbed.

However, the pressure drops associated with such adsorbers are substantial and temperature distribution is not homogeneous over the adsorber cross-section. Another serious disadvantage is that concentration distribution is inconsistent over the adsorber cross-section so that a wide mass transfer zone (adsorption zone) results and the adsorber cannot be fully used. Further, the adsorber has been loaded to the point of "breakthrough" when the beginning of the mass transfer zone has reached the end of the adsorption layer.

Also, many of the conventional adsorptions proceed exothermally, so that local overheating (hot spots) arises in the bed of solid adsorbent material and limits the working life of the adsorbents. In order to keep these hot spots within limits i.e., to improve heat removal to the adsorber walls, adsorbers have been provided with a number of cooling tubes flowed through by a heat-receiving medium. This construction, however, is expensive and complex to produce.

In addition to the known constructions hereinbefore described, the use of a so-called static mixers is also possible as described in European Patent Application 0 289 755 wherein the mixers comprise an assembly of a number of stationary crossing layers in a cylinder, the layers either being coated with a solid adsorbent, for example, by means of a binder, or being themselves made of adsorbent. These constructions have some advantages as regards homogeneous temperature distribution and uniform concentration distribution, short dwell time and a relatively reduced pressure drop when used in adsorption processes. However, there are substantial disadvantages in that the adsorption materials contact the fluid phase solely on the surfaces of the static mixers. Also, coating the layers is labor-intensive and can often be performed only by means of binders, such as intermediate layers of aluminum oxide, something which reduces the effectiveness of the adsorption materials.

When the layers of the static mixer themselves consist of an adsorbent material, the material used for the layers must be capable of being readily brought to the required shape. Such materials are sometimes very expensive.

Accordingly, it is an object to the invention to more effectively use sorption materials in devices for performing a sorption process.

It is an object of the invention to provide a sorption device capable of a long working life.

It is an object of the invention to provide a device for performing a sorption process which is able to use a broad spectrum of adsorption materials.

Briefly, the invention provides a device for performing a sorption process comprising a plurality of parallel corrugated layers disposed in side-by-side contiguous relation with each layer having corrugations disposed in crossing relation to the corrugations of an adjacent layer in order to define flow channels therebetween for an adsorptive-containing medium. In accordance with the invention, each layer has a pair of parallel walls defining a cavity therebetween with at least some of the walls being permeable to an adsorptive and impermeable to sorption materials. Also, a sorption material is disposed in the cavity of at least some of the layers for removal of the adsorptive from the medium flowing through the flow channels.

The sorption materials may be a solid adsorbent, such as active carbon, silica gel, aluminum oxide, a zeolite or an ion exchange resin, or a liquid absorbent, such as water, acetone, kerosene, methanol and a chemisorbent, such as sodium hydroxide and diethanolamine solution.

One important advantage provided by the device is that the properties known for pure mixing processes, such as homogeneous temperature distribution and evening-out of concentration over the cross-section, a narrow dwell time spread and very little, if any, reflux mixing are used -- i.e., a so-called plug flow exists.

Another significant consideration is that the capacity of a solid sorption material bed can be better used because of this uniform temperature distribution and of the evening-out of concentration over the adsorber cross-section.

A solid-bed adsorber constructed in the above manner can, as compared with the known solid-bed adsorbers previously mentioned, have a solid bed length which is shorter for a given throughput.

In one embodiment, a number of such devices are disposed one above another in an adsorber column. Advantageously, in this case, the devices disposed one above another are staggered by approximately 90° relative to one another, referred to the adsorber longitudinal axis.

Basically, the sorption device can be in the shape of any static mixer; however, structures such as are described and shown, for example, in Swiss patents 547,120 and 642,564 are particularly advantageous.

Another advantageous field of use for the sorption device is in chromatographic separating processes consisting mainly of a continuously proceeding combination of adsorption and desorption steps.

Processes of this kind and some applications have been described in detail, for example, in an article entitled "Preparative Application of HPLC, A. Wehrli; in: Practice of High Performance Liquid Chromatography, H. Engelhardt, ed., Springer Verlag 1986, S. 109".

A great disadvantage of an irregular fill for chromatography as compared with the static mixer structures disposed in accordance with the invention is the absence of uniform radial temperature and concentration distribution over the column cross-section. Also, because of the irregular flow form of the mobile phase there is a relatively high pressure drop as compared with the regular structure of the static mixer structures used in accordance with the invention.

If the structures according to the invention are used in the chromatography column instead of the known irregular fills, all the advantages achieved for the adsorber hereinbefore described result.

One important field of use for the sorption device is where at least one component present in a low concentration is to be separated from a large surplus of a mixture component which has little sorbability, if at all.

Figure 2:
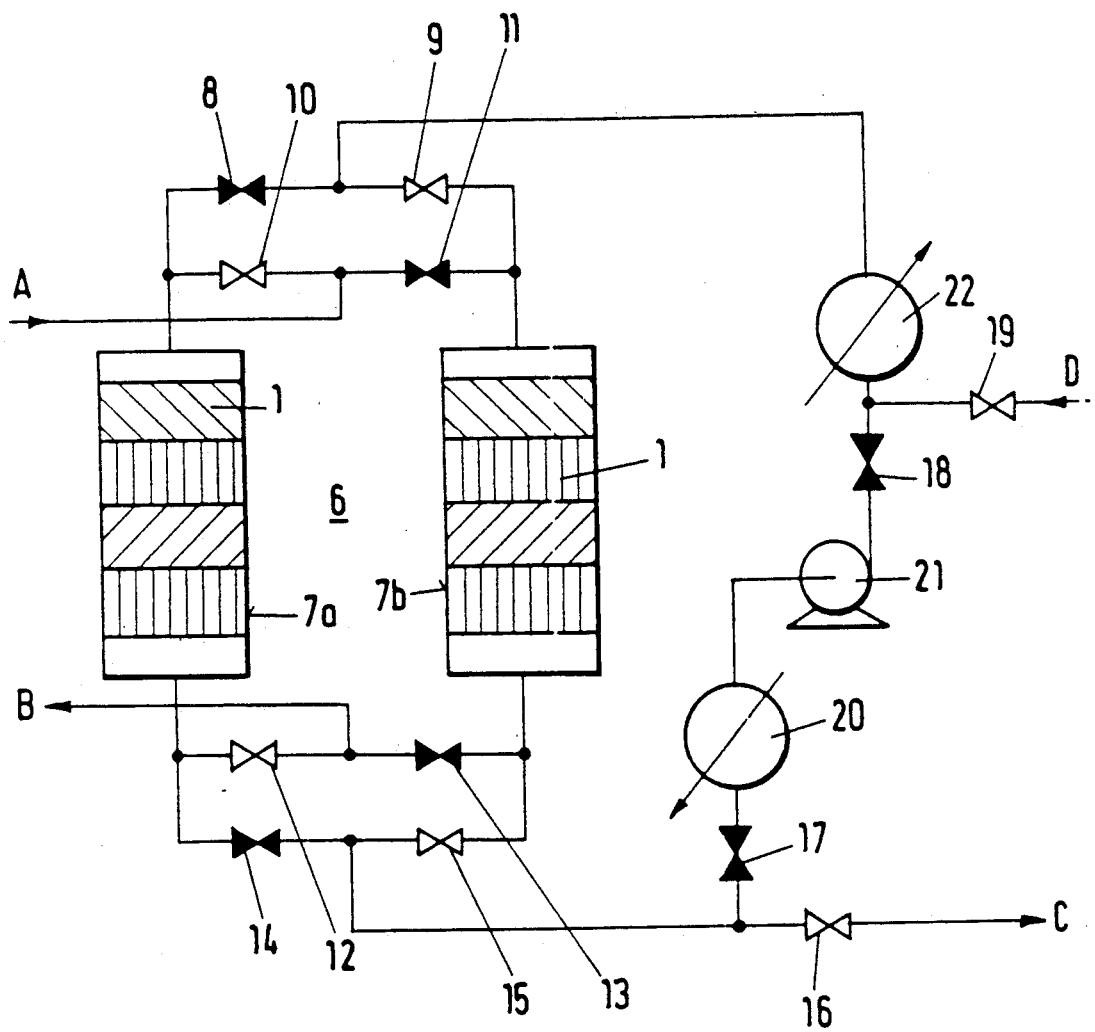

These and other objects and advantages of the invention will become more apparent from the following detailed description taken in conjunction with the accompanying drawings wherein:

FIG. 1 illustrates a perspective view of a static mixer constructed in accordance with the invention for use in a sorption device;

FIG. 2 schematically illustrates a solid bed adsorption apparatus in accordance with the invention;

FIG. 3 schematically illustrates a chromatopraphy separating apparatus constructed in accordance with the invention; and FIG. 4 illustrates a detail of FIG. 3 to larger scale.

Referring to FIG. 1, the sorption device is in the general form of a static mixer and comprises a plurality of parallel corrugated layers 2 disposed in side-by-side contiguous relation with each layer 2 having corrugations 5 disposed in crossing relation to the corrugations of an adjacent layer in order to define flow channels therebetween for an adsorptive-containing medium. As indicated, each layer 2 has a pair of parallel walls 2a, 2b which define a cavity therebetween filled with a sorption material 4. In addition, the walls 2a, 2b are permeable to the adsorptive while being impermeable to the sorption material 4.

The double walls 2a, 2b of the layers 2 may be made of a mesh fabric particularly where the sorption material 4 is a solid material. For example, the mesh fabric may be made of metal, glass and/or plastic. In addition, the walls 2a, 2b may be made of a fleece of fibers consisting of glass and/or plastic. Alternatively, each wall 2a, 2b may be made of a porous material having pores of a size permeable by the adsorptive and impermeable by the sorption material 4. For example, each wall may be a semi-permeable diaphragm.

In other embodiments, each wall 2a, 2b may be made of a sintered material.

The sorption material 4 may be made from polymerized solid particles in order to form a porous composition, such as a porous ceramic structure or a sintered structure. The sorption material may also be a liquid material or may be dissolved in a liquid for absorption of the adsorptive.

As illustrated in FIG. 1, the sorption device has a circular cross-section which may be adapted to the shape of an adsorber casing in which the device is mounted. For example, the cross-section may also be square, rectangular or polygonal.

Referring to FIG. 2, the solid-bed adsorption apparatus 6 has two cylindrical adsorber casings 7a, 7b in each of which a plurality of sorption devices 1 are stacked one above another. Consecutively adjacent devices, if of the kind shown in FIG. 1, are staggered at right-angles to one another as referred to the tube axis.

FIG. 2 shows the known technology of an apparatus having two adsorber columns regenerated by temperature swing (desorption stage).

In FIG. 2 there can be seen adsorbers 7a, 7b, valves 8-19, a cooler 20, a circulating fan 21, a heater 22, a gas inlet A, a gas outlet B, a desorbate outlet C and a desorption gas inlet D.

When the adsorber 7a is in the adsorption phase, the adsorber 7b is being regenerated and vice versa. In use, the adsorptive-charged vehicle gas enters the apparatus through the gas inlet A and enters the adsorber 7a by way of the valve 10. The gas has the adsorptive removed therefrom in the adsorber 7a and leaves the apparatus through the valve 12 and the gas outlet B. The adsorption is effective either to remove unwanted adsorptive from the vehicle gas or to obtain the adsorptive as a required end product.

The adsorber 7b was previously charged with adsorptive and is in the desorption phase. To this end, desorption gas is introduced into the circuit by way of the desorption gas inlet D and the valve 19, heated in the heater 22 and introduced through the valve 9 into the adsorber 7b. The adsorptive is desorbed and the mixture leaves the apparatus by way of the valves 15, 16 and the desorbate outlet C.

When column 7b has been regenerated in this way, cooling starts. To this end, for example, the heater 22 can be stopped and the valves 16, 19 closed. When the valves 18, 17 are open, the desorption gas continues to be circulated by way of the fan 21 and cooler 20 until the adsorber 7b has been cooled to the adsorption temperature. Thereafter, the operation of the columns 7a, 7b is changed over by appropriate operation of the valves.

In addition to the temperature swing, the pressure swing and the use of a displacing gas count as technical desorption processes. If the desorption stage is of great complexity, more than two columns may be necessary for the process. In the example described, the adsorption time and the desorption time must be the same as one another. If a multicolumn apparatus is connected up appropriately, the relationship between the adsorption time and the desorption time is more flexible without impairment of fully continuous operation of the apparatus.

The use of the sorption devices and the advantages described herein reduce the quantity of adsorbent required as compared with the adsorber described in the introduction hereof. Hot spots are substantially obviated because of the satisfactory removal of heat to the adsorber wall.

FIG. 3 is a diagrammatic view of a chromatography separating column 23 which is of diameter d and length L and in which a chromatography packing having a plurality of sorption devices 1 (see e.g. FIG. 1) is disposed.

Distributors 24, 25 are disposed above and below the complete packing section. The mass separation occurs in the packing section.

In this case, the packings 1 are flowed through continuously by a liquid or gas or vapor phase C. In liquid chromatography, the mobile phase C is embodied by an eluting agent and, in gas chromatography, by the vehicle gas. For each separation, a quantity of a specimen A+B to be separated is added to the mobile phase C immediately before the column entry by a dispenser 26. In the separating column, the discrete components A, B are taken up to different extents by the stationary phase—i.e., the sorption material 4—and retained for different times (see FIG. 4). Consequently, the components A, B move slower than the mobile phase C. Since the discrete components move at different speeds according to their properties, the initially consistent mixture A+B gradually splits up into component zones A and B which have travelled different distances in the column after a predetermined transit time (FIG. 3).

The construction of a column 23 is affected by two factors, i.e. the nature of the stationary phase 4 and the flow resistance of the mobile phase C.

The advantages of the column having the sorption devices 1 as compared with a column having an irregular packing arise from the greater throughput and the lower flow resistance of the mobile phase and from the resulting possibility of slim column geometry.

Also, the use of the sorption devices enables the complete apparatus to be scaled up readily.

In one embodiment not shown, the sorption device may be combined with a means for passing a heat exchange medium through the cavities of alternating layers 2. In this case, the cavities of the remaining layers contain sorption material. In this way, the sorption material which is in the separation device may be heated or cooled by the appropriate heat exchange medium.

The invention thus provides a sorption device for performing a sorption process in which the pressure drop through the device is held to a minimum while a homogeneous temperature distribution can be obtained.

The invention further provides a sorption device of relatively simple construction.

What is claimed is:

1. A device for performing a sorption process comprising
   a plurality of parallel corrugated layers disposed in side-by-side contiguous relation, each said layer having corrugations disposed in crossing relation to the corrugations of an adjacent layer to define crossing flow channels therebetween for an adsorptive-containing medium, each said layer having a pair of parallel walls defining a cavity therebetween, at least some of said walls being permeable to an adsorptive in the adsorptive containing medium and impermeable to sorption materials; and
   a sorption material in said cavity of at least some of said layers for removal of the adsorptive from the medium flowing through said flow channels.

2. A device as set forth in claim 1 wherein each wall is made of mesh fabric and said sorption material is a solid material.

3. A device as set forth in claim 2 wherein said mesh fabric is made of metal.

4. A device as set forth in claim 2 wherein said mesh fabric is made of a material selected from the group consisting of glass and plastic.

5. A device as set forth in claim 1 wherein each wall is made of a fleece of fibers selected from the group consisting of glass and plastic.

6. A device as set forth in claim 1 wherein each wall is made of a porous material having pores of a size permeable by the adsorptive and impermeable by said sorption material.

7. A device as set forth in claim 6 wherein each wall is a semi-permeable diaphragm.

8. A device as set forth in claim 6 wherein each wall is made of sintered material.

9. A device as set forth in claim 1 wherein said sorption material is comprised of solid particles.

10. A device as set forth in claim 1 wherein said sorption material is made from polymerized solid particles to form a porous composition.

11. A device as set forth in claim 10 wherein said composition is one of a porous ceramic structure and a sintered structure.

12. A device as set forth in claim 1 wherein said sorption material is a liquid material for absorption of the adsorptive.

13. A device as set forth in claim 1 which further comprises means for passing a heat exchange medium through said cavities of alternating layers and said cavities of the remaining layers contain said sorption material.

14. A sorption device comprising
    a static mixer having pairs of parallel walls, each said pair of parallel walls defining a cavity therebetween and being shaped relative to an adjacent pair of parallel walls to define flow channels for an adsorptive-containing medium, each said wall being permeable to an adsorptive in the adsorptive-containing medium and impermeable to the sorption material; and
    a sorption material in each said cavity for removal of the adsorptive from the medium flowing through said flow channel.

15. A chemisorption device comprising
    a plurality of parallel corrugated layers disposed in side-by-side contiguous relation, each said layer having corrugations disposed in crossing relation to the corrugations of an adjacent layer to define flow channels therebetween for an adsorptive-containing medium, each said layer having a pair of parallel walls defining a cavity therebetween, at least some of said walls being permeable to an adsorptive in the adsorptive-containing medium and impermeable to sorption materials; and
    one of a liquid sorption medium and solid sorption medium in said cavity of at least some of said layers for removal of the adsorptive from the medium flowing through said flow channels.

16. A chromatography separating apparatus comprising
    a column;
    a plurality of packings stacked within said column, each said packing including
    a plurality of parallel corrugated layers disposed in side-by-side contiguous relation, each said layer having corrugations disposed in crossing relation to the corrugations of an adjacent layer to define flow channels therebetween for an adsorptive-containing medium, each said layer having a pair of parallel walls defining a cavity therebetween, at least some of said walls being permeable to an adsorptive in the adsorptive-containing medium and impermeable to sorption materials; and
    a sorption material in said cavity of at least same of said layers; and
    means for passing a mobile phase containing at least two materials to be separated into said column to flow through said packings for separation of the two materials by adsorption of one material into said sorption material.

* * * * *